(12) United States Patent
Czaja et al.

(10) Patent No.: US 7,529,221 B2
(45) Date of Patent: May 5, 2009

(54) SYSTEM AND METHOD FOR DIGITAL MULTIMEDIA BROADCASTING

(75) Inventors: Stash Czaja, Cardiff, CA (US); Feng Qian, Buffalo Grove, IL (US)

(73) Assignee: Taiwan Semicondutor Manufacturing Co., Ltd., Hsin-Chu (TW)

( * ) Notice: Subject to any disclaimer, the term of this patent is extended or adjusted under 35 U.S.C. 154(b) by 567 days.

(21) Appl. No.: 11/280,989

(22) Filed: Nov. 17, 2005

(65) Prior Publication Data

US 2006/0114857 A1 Jun. 1, 2006

Related U.S. Application Data

(60) Provisional application No. 60/629,731, filed on Nov. 19, 2004.

(51) Int. Cl.
*H04B 7/216* (2006.01)

(52) U.S. Cl. .................. 370/342; 370/442; 370/367; 370/388; 370/390; 370/433; 370/441

(58) Field of Classification Search .............. 370/342, 370/367, 387, 388, 432, 441, 442, 390
See application file for complete search history.

(56) References Cited

U.S. PATENT DOCUMENTS

| | | | |
|---|---|---|---|
| 2003/0128658 A1* | 7/2003 | Walton et al. | 370/208 |
| 2003/0194992 A1* | 10/2003 | Kim et al. | 455/414.1 |
| 2003/0211855 A1* | 11/2003 | Sarkkinen et al. | 455/466 |
| 2005/0068977 A1* | 3/2005 | Na et al. | 370/432 |
| 2005/0083932 A1* | 4/2005 | Lee et al. | 370/390 |

\* cited by examiner

*Primary Examiner*—Rafael Pérez-Gutiérrez
*Assistant Examiner*—Nimesh Patel
(74) *Attorney, Agent, or Firm*—K & L Gates LLP

(57) ABSTRACT

A system for sending multimedia information from at least one base station to one or more mobile stations via at least one wireless communication link includes at least one multimedia source for generating the multimedia information. At least one processor is coupled to the multimedia source for generating a number of data streams derived from the multimedia information on a media control access (MAC) layer. At least one data channel modulator is coupled to the processor for mapping the data streams into a number of data packets on a forward packet data channel between the base station and the mobile station, using a physical layer signaling based on a code-division multiple access (CDMA) or orthogonal frequency division modulation (OFDM) technology.

16 Claims, 6 Drawing Sheets

SYSTEM AND METHOD FOR DIGITAL MULTIMEDIA BROADCASTING

RELATED APPLICATION

This application is related to and claims priority of U.S. Provisional Application Ser. No. 60/629,731 filed Nov. 19, 2004 entitled "SYSTEM AND METHOD FOR DIGITAL MULTIMEDIA BROADCASTING," the contents of which are hereby incorporated by reference.

BACKGROUND

The present invention relates generally to wireless communication, and more particularly to a system and method for digital multimedia broadcasting.

Many wireless communication technologies have been provided for mobile communications. The technologies include, for example, the global system for mobile communications (GSM), the code-division multiple access (CDMA), and orthogonal frequency division modulation (OFDM).

As one of the most popular technologies, CDMA has experienced much advancement since its introduction into the commercial wireless world, and now has various versions such as CDMAOne and CDMA 2000. CDMA is a wide-band, spread-spectrum technology, in which signals for a plurality calls are spread across a broad frequency spectrum. A unique code is assigned to each of the signals for a receiver to identify the call that it must handle. The spread-spectrum and signal encoding characteristics allow the CDMA technology to offer various benefits, such as increased capacity and better communication security.

OFDM is a relatively new technology as opposed to CDMA. The OFDM technology distributes the data over a large number of carriers that are spaced apart at precise frequencies, which helps to prevent the demodulators from seeing frequencies other than their own. The benefits of OFDM include, for example, high spectral efficiency, resiliency to radio frequency (RF) interference, and lower multi-path distortion.

Conventionally, these wireless communication technologies are typically used by many wireless communication systems for carrying voice information. As the wireless communication technology advances, so does the demand by users for a greater variety of information. For example, in addition to voice information, users may desire to receive multimedia information that includes both the audio and video contents from the wireless communication systems.

As such, what is needed is a system and method for providing the users with multimedia information using the wireless communication technology.

SUMMARY

The present invention discloses a system for sending multimedia information from at least one base station to one or more mobile stations via at least one wireless communication link. In one embodiment of the invention, the system includes at least one multimedia source for generating the multimedia information. At least one processor is coupled to the multimedia source for generating a number of data streams derived from the multimedia information on a media control access (MAC) layer. At least one data channel modulator is coupled to the processor for mapping the data streams into a number of data packets on a forward packet data channel between the base station and the mobile station, using a physical layer signaling based on a code-division multiple access (CDMA) or orthogonal frequency division modulation (OFDM) technology.

The construction and method of operation of the invention, however, together with additional objectives and advantages thereof will be best understood from the following description of specific embodiments when read in connection with the accompanying drawings.

DESCRIPTION

The present invention relates generally to wireless communication, and more particularly to a system and method for digital multimedia broadcasting. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
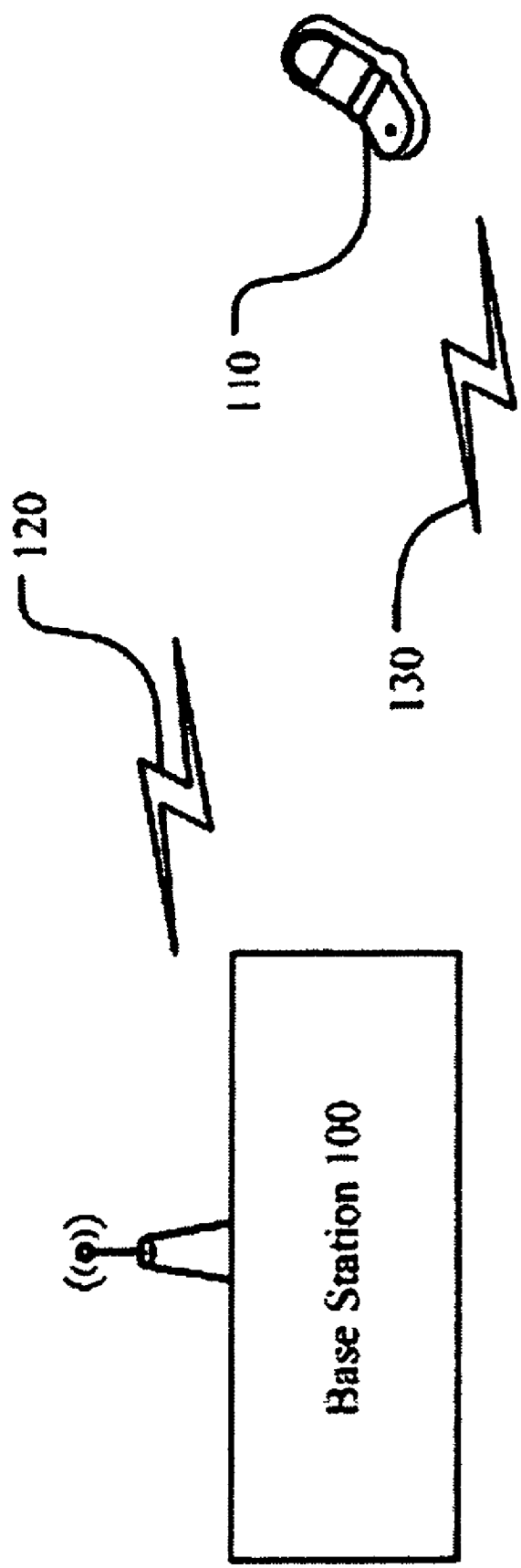
FIG. 1 illustrates a wireless communication system in accordance with one embodiment of the present invention.

FIG. 1 illustrates a wireless communication system in accordance with one embodiment of the present invention. The system includes a base station (BS) 100 and a mobile station (MS) 110. Examples of MS 110 include a mobile phone, personal digital assistant (PDA), and laptop computer. Communication from the BS 100 to the MS 110 occurs over a forward link 120, while communication from the MS 110 to the BS 100 occurs over a reverse link 130. Various wireless communication technologies, such as GSM, CDMA and OFDM, can be used to transmit information over the forward and reverse links 130. The BS 100 can use the forward link 120 to broadcast or multicast multimedia information to the MS 110. It is noted that the term "broadcast" refers to transmitting information non-discriminatorily for the MS' 110 associated with the BS 100, while "multicast" refers to transmitting information for a selected group of MS' 110 among those associated with the BS 100.

Figure 2:
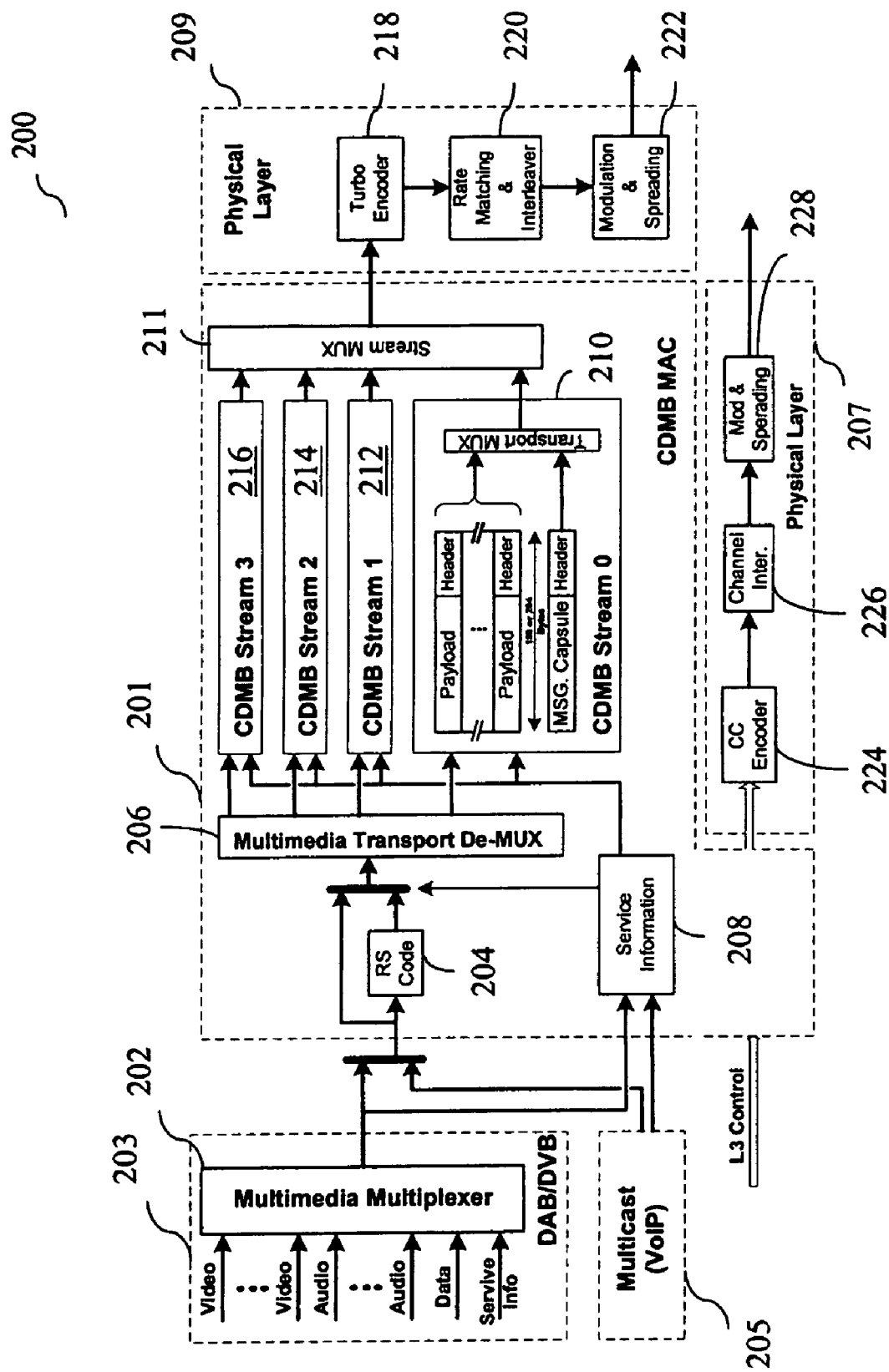
FIG. 2 illustrates a block diagram showing a system for transmitting multimedia information using a predetermined wireless communication technology in accordance with one embodiment of the present invention.

FIG. 2 illustrates a block diagram 200 showing one system for transmitting multimedia information using CDMA technologies, such as CDMA 2000, in accordance with one embodiment of the present invention. It is noted that other communication technologies, such as OFDM can also be used for transmitting the multimedia information.

Referring to FIGS. 1 and 2 simultaneously, the system 200 includes a cellular digital multimedia broadcast (CDMB) processor 201 coupled to a multimedia information source 203 and VoIP information source 205, which refers to the voice information transmitted by using the Internet Protocol. The CDMB processor 201 operates on the medium access control (MAC) layer for coordinating access to a shared communication medium. The CDMB processor 201 receives the multimedia signals and voice signals from the multimedia source 203 and the VoIP source 205, respectively, and outputs CDMB data streams to a data channel modulator 209 for transmitting them to the MS 110 over a packet data channel of the forward link 120. The CDMB processor is also coupled with a control channel modulator 207 for transmitting control signals to the MS 110 over a packet data control channel of the forward link 120.

The multimedia source 203 includes a multimedia multiplexer 202 that receives a number of audio, video and service information signals. The audio and video information signals are generated from one or more multimedia programs. The service signal allows a user to select among a number of functions associated with the multimedia programs. The multimedia multiplexer 202 may transmit the audio, video and service information signals over an interface to a RS code module 204, which is essentially a logic circuit or software that uses Reed-Solomon cores for correcting errors of the signals it receives from the multimedia multiplexer 202. The signals output from the multimedia multiplexer 202 can be in a format, such as MPEG II.

The RS code module 204 receives the voice signals from the VoIP source 205 and outputs modified signals to a multimedia transport de-multiplexer 206. A service information module 208 also receives the voice signals from the VoIP source 205 and adds service information, which provides program-related functions, to the signals received from the VoIP source 205.

The multimedia transport de-multiplexer 206 receives the output signals from the RS code module 204 and the service information module 208 and generates a number of CDMB data streams 210, 212, 214 and 216. The contents of the output signals of the RS code module 204 and the service information module 208 are encapsulated into the payloads of the CDMB data streams 210, 212, 214 and 216. One or more message capsules can be assembled into one or more of the CDMB data streams 210, 212, 214 and 216 for indicating the data recipients. The multimedia transport de-multiplexer 206 extracts program specific information from the output signals of the RS code module 204, and inserts it into the CDMB data streams 210, 212, 214 and 216 for indicating their corresponding program association. For example, the output signals can be configured in MPEG II format, and the program specific information can include, for example, program access tables (PAT), conditional access tables (CAT) and program map tables (PMT).

The stream multiplexer 211 receives the CDMB data streams 210, 212, 214 and 216 and inserts dedicated signaling information in its output signals to the data channel modulator 209 for establishing a dedicated signaling path for the multimedia information. The turbo encoder 218 encodes the CDMB data streams received from the stream multiplexer 211 into a plurality of data frames. The rate matching and interleaver 220 re-sequences the data frames in a predetermined manner. The modulation and spreading module 222 assigns the frames with spreading codes, such as Walsh codes, and spreads the coded frames as data packets on packet data channels over a predetermined frequency band using a predetermined transport format, such as the existing 1xEV-DV format.

The control channel modulator 207 transmits control signals on a dedicated packet data control channel in response to level-three (L3) control commands received by the CDMB processor 201. The control channel encoder 224 encodes the level-three control commands into data frames. The channel interleaver 226 distributes these frames in a predetermined manner. The modulation and spreading module 228 assigns the frames with the Walsh codes and spreads the coded frames as data packets on packet data control channels over a predetermined frequency band.

In this embodiment of the present invention, the frequency band can be 1.25 MHz wide and the frame can be 5 ms in size. All 30 Walsh codes for CDMA 2000 can be used. The data transmission rate can be set from 304 to 2,288 kbps. It is noted that the SYNC channel, paging channel and other fundicated channels may not be needed or used in the embodiment.

In another embodiment of the present invention, the multimedia information can be transmitted by a system based on OFDM technology. The OFDM-based system is similar to the system 200 shown in FIG. 2 with the exception that the data channel modulator 209 and the control channel modulator 207 operate based on OFDM technology instead of CDMA technology. For example, instead of assigning Walsh codes to the data frames received from the interleaver 218, the modulation and spreading module 292 assigns OFDM tones to the frames, and spreads them among various frequency channels. The OFDM-based modulation may include a Eureka-Digital Audio Broadcasting (DAB) compatible structure with 80% carrier spacing, in order to fit in the 1.2288 MHz cellular band.

The data link established based on the OFDM technology may have the following exemplary characteristics. All of the CDMB traffic can be carried over a single physical layer channel. Each frame can be 5 ms long, with a preamble and five data symbols. The preamble may include a pilot symbol covered by BS signature pattern, and a control symbol. The pilot symbols are uniformly and symmetrically distributed over the channel for enhancing detection performance.

The multimedia information transmitted by the system 200 can be configured in at least two formats. One is the broadcast format that allows a plurality of MS' 110 to receive the multimedia information transmitted from the BS 100 non-discriminatorily. The other is the multicast format that allows only a specifically designated group of MS' 110 to receive the multimedia information transmitted from the BS 100.

Figure 3:
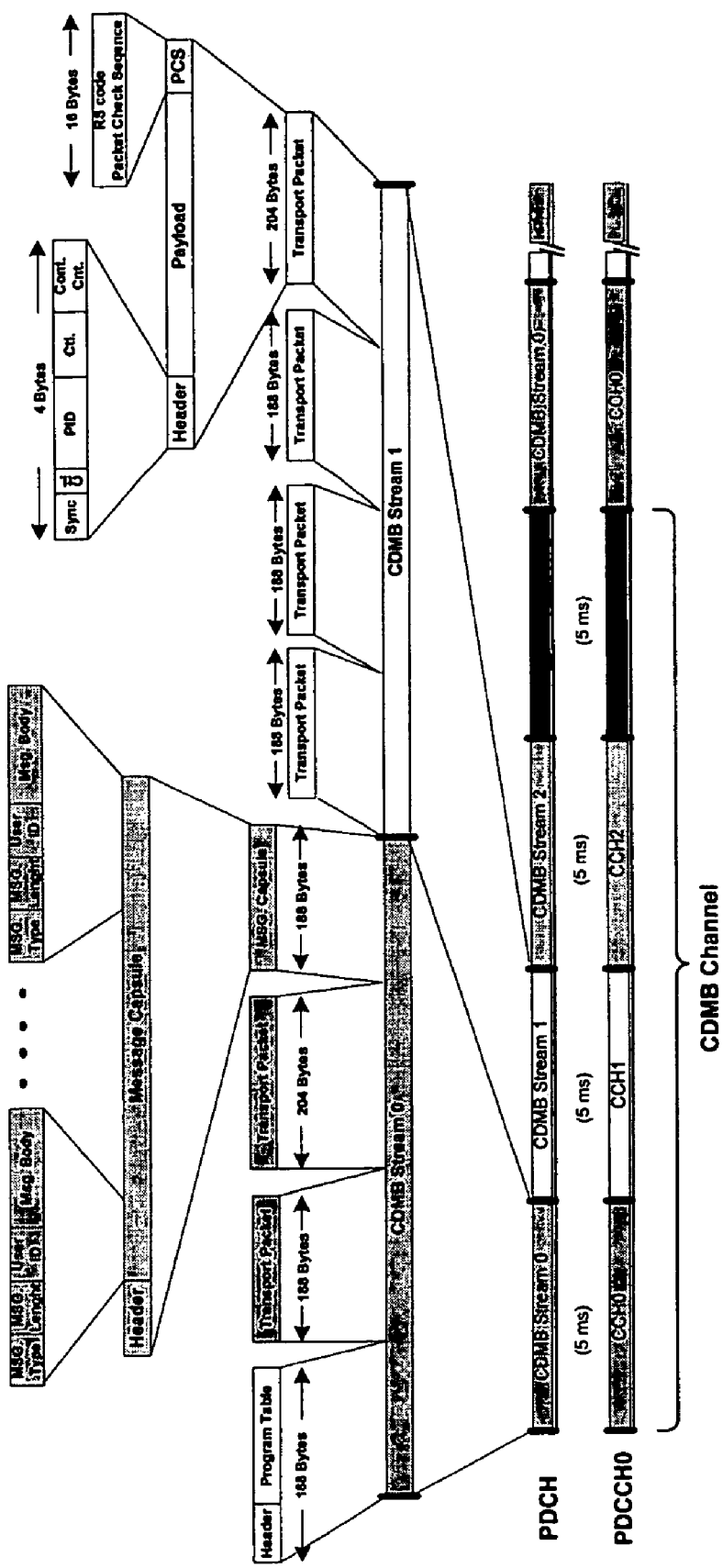
FIG. 3 illustrates channel structures of the multimedia information transmitted in a broadcast format in accordance with one embodiment of the present invention.

FIG. 3 illustrates channel structures of the multimedia information transmitted in a broadcast format in accordance with one embodiment of the present invention. Coded frames for CDMB stream 0, CDMB stream 1, CDMB stream 2 and CDMB stream 3 are distributed over packet data control channel. Each CDMB stream has a number of transport packets. For example, CDMB stream 1 has four transport packets, each of which has a header, payload and packet check sequence (PCS) according to a structure defined by the MAC protocol. The CDMB stream 0 has a number of transport packets and a message capsule, which has a number of message bodies identified by the message type, message length and user identification.

Figure 4:
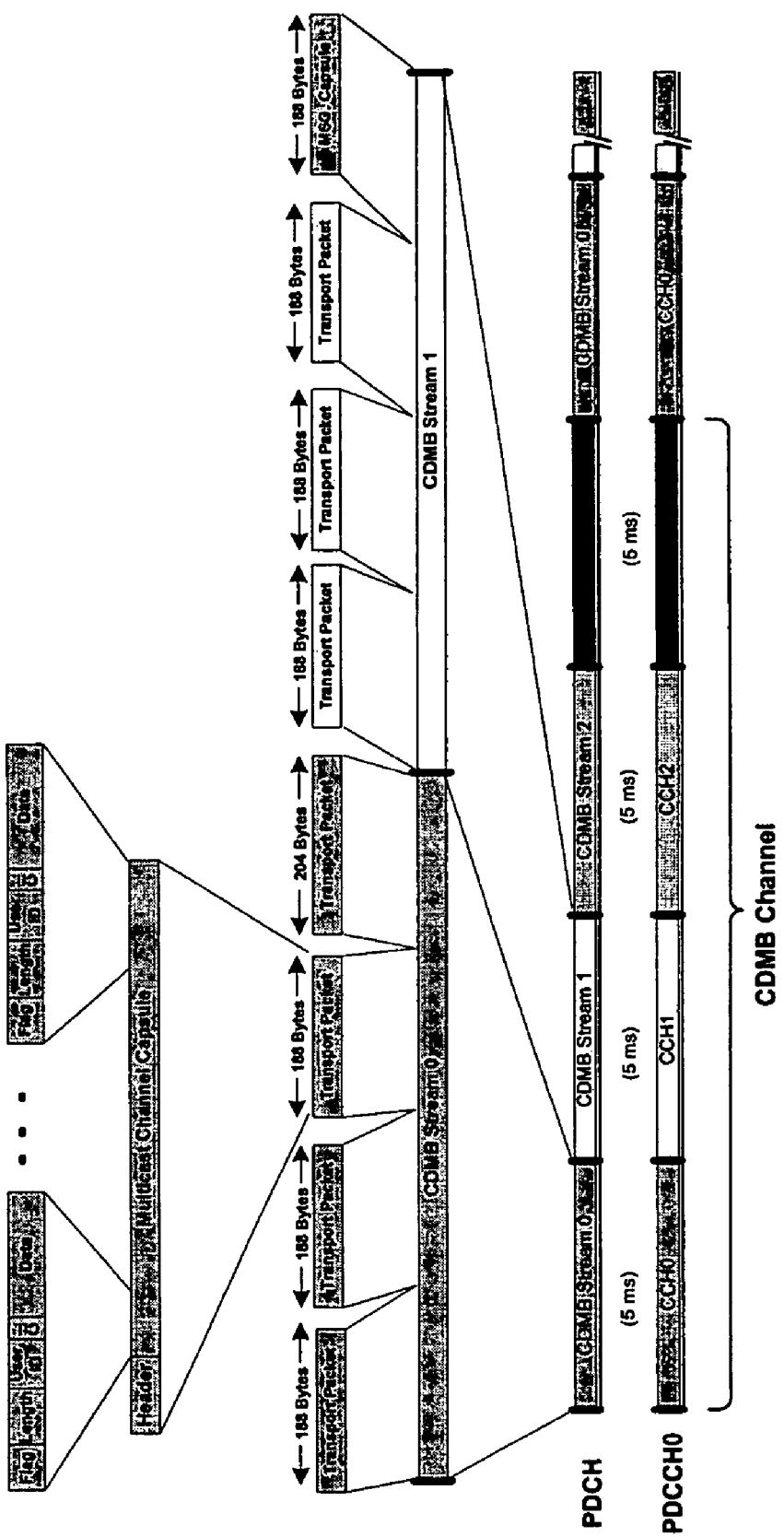
FIG. 4 illustrates channel structures of the multimedia information transmitted in a multicast format in accordance with one embodiment of the present invention.

FIG. 4 illustrates channel structures of the multimedia information transmitted in a multicast format in accordance with one embodiment of the present invention. Coded frames for CDMB stream 0, CDMB stream 1, CDMB stream 2 and CDMB stream 3 are distributed over packet data control channel. Each CDMB stream has a number of transport packets. Each transport packet includes a header followed by the multicast channel capsule, which is identified by the message type, message length and user identification.

Figure 5:
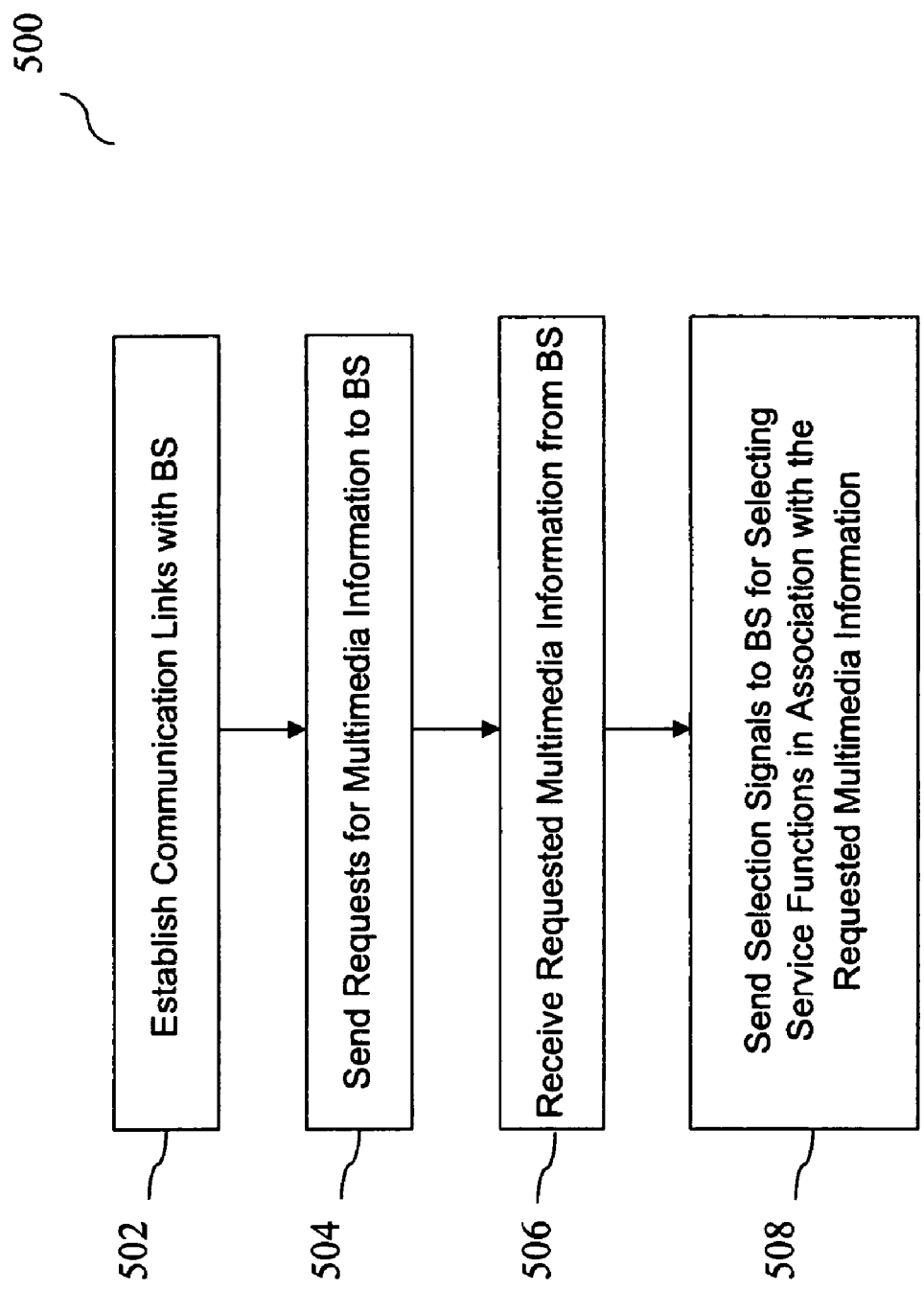
FIG. 5 illustrates a flowchart showing one method for initiating the multimedia information transmission at the mobile station end in accordance with one embodiment of the present invention.

FIG. 5 illustrates a flowchart 500 showing one method for initiating the multimedia information transmission at the user end in accordance with one embodiment of the present invention. Referring simultaneously to FIGS. 1 and 5, in step 502, the MS 110 establishes a forward link 120 and a reverse link 130 with the BS 100. The MS 110 sends a request for the multimedia information to the BS 100 via the reverse link 130 in step 504. Upon receiving the request, the BS 100 directs the MS 130 to a cellular digital multimedia broadcasting (CDMB) carrier, which can be a separate entity from the regular wireless communication carrier of the MS 130, for processing the multimedia information into a number of data packets on a media control access (MAC) layer in response to the request. The separate entity may provide an unified billing information for the multimedia information it provided. The MS 110 then receives the multimedia information sent by the BS 100 via the forward link 120 based on the CDMA or OFDM technology in step 506. The MS 110 may optionally send a selection signal to the BS 100 for selecting one or more service functions in association with the received multimedia information in step 508. This allows the MS 110 to interact with the BS 100 for better utilizing the received multimedia information.

Figure 6:
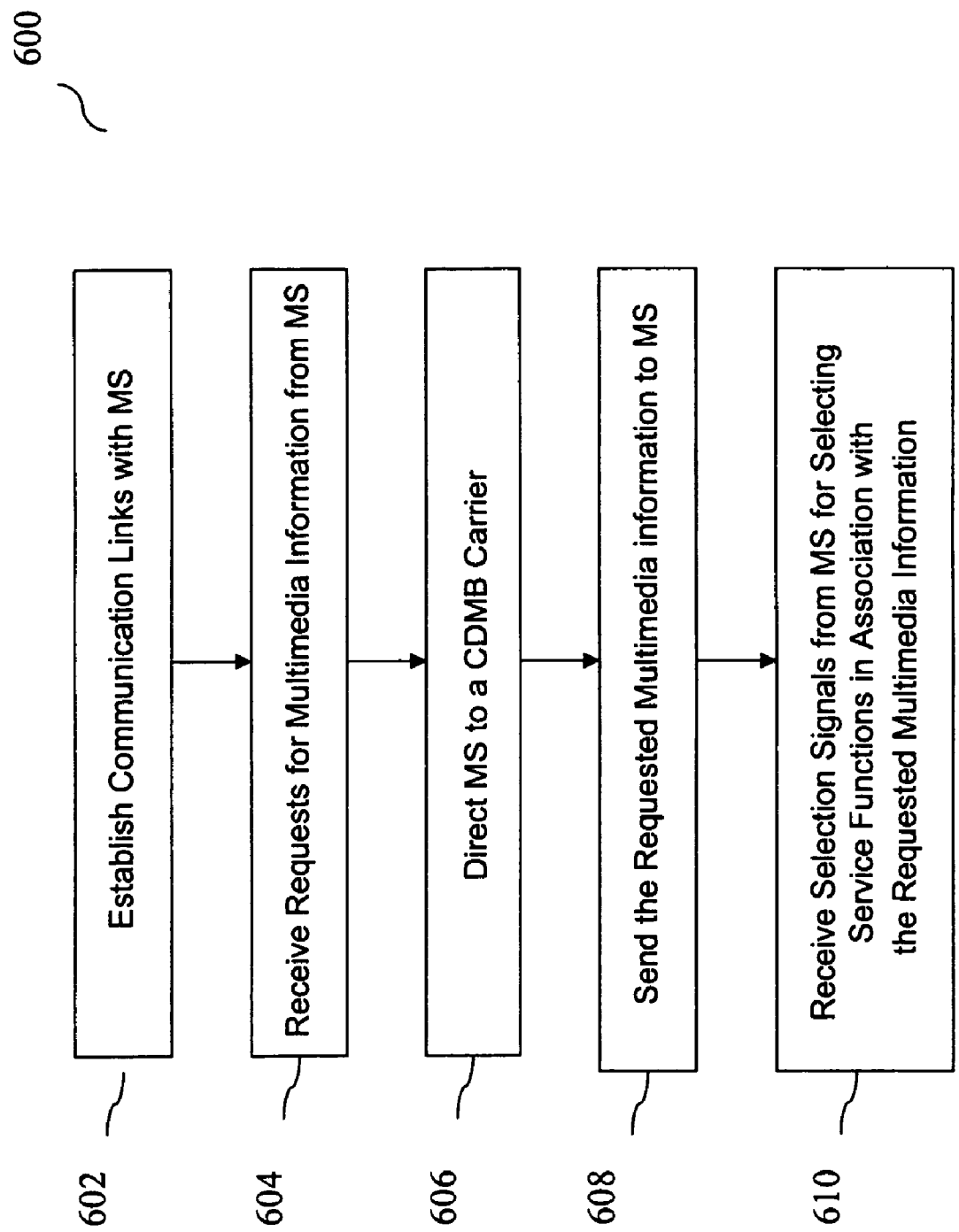
FIG. 6 illustrates a flowchart showing one method for providing the multimedia information at the base station end in accordance with one embodiment of the present invention.

FIG. 6 illustrates a flowchart 600 showing one method for providing the multimedia information at the base station end in accordance with one embodiment of the present invention. Referring to FIGS. 1 and 6 simultaneously, in step 602, the BS 100 establishes a forward link 120 and a reverse link 130 with the MS 110. The process of establishing the links may include authentication of MS 110. The BS 100 receives a request for the multimedia information from the MS via the reverse link 130 in step 604. The BS 100 then directs the MS 110 to a CDMB carrier for processing the multimedia information into a number of data packets on a media control access (MAC) layer in response to the received request. The CDMB carrier then uses the BS 100 to send the requested multimedia information to the mobile station via the forward link 120 based on the CDMA or OFDM technology in step 608. The BS 100 may optionally receive a selection signal from the MS 110 for selecting one or more service functions in association with the requested multimedia information in step 610. This allows the MS 110 to interact with the BS 100 for better utilizing the received multimedia information.

One advantage of CDMB is that it can provide services over the CDMA or OFDM based cellular links, therefore saving time and costs for its implementation. It may also use the existing infrastructure for authentication and billing. Thus, the present invention is able to provide the mobile station users with a variety of multimedia information in a cost-economic way.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system for digital multimedia broadcasting comprising:
   a multimedia source for generating a plurality of multimedia signal outputs;
   a multicast module for generating voice information using Internet Protocol;
   an error correction module for receiving the multimedia signal outputs and the voice information and generating corrected multimedia information;
   a de-multiplexer coupled to the error correction module for receiving the corrected multimedia information and generating one or more cellular digital multimedia broadcast (CDMB) data streams;
   a stream multiplexer for receiving the one or more CDMB data streams and inserting a dedicated signaling information in each of the one or more CDMB data streams, and assembling at least one message capsule into the one or more CDMB data stream for indicating data recipients on a media control access (MAC) layer; and
   at least one data channel modulator coupled to the stream multiplexer for establishing a dedicated signaling path for the corrected multimedia information based on the one or more CDMB data streams output of the stream multiplexer;
   wherein the at least one data channel modulator each having a physical layer signaling based on a code-division multiple access (CDMA) or orthogonal frequency division modulation (OFDM) technology for mapping the CDMB data streams into a number of data packets on a forward packet data channel according to a predetermined data format and a MAC protocol between a base station and a mobile station.

2. The system of claim 1, further comprising:
   at least one control channel modulator for transmitting a control signal on a dedicated packet data control channel in response to a level-three (L3) control command.

3. The system of claim 2, wherein the at least one control channel modulator maps the control signal into a forward packet data control channel between the base station and the mobile station, using a physical layer signaling based on CDMA or OFDM technology.

4. The system of claim 1, wherein the data packets are transmitted in a broadcast or multicast format.

5. The system of claim 4, wherein when the data packets are configured in the broadcast format, each of the CDMB data streams comprises a packet check sequence according to a MAC protocol, and one of the CDMB data streams has a message capsule.

6. The system of claim 4, wherein each of the CDMB data stream comprises a number of transport packets, each having a header followed by a message capsule.

7. The system of claim 1, wherein the de-multiplexer extracts a program access table (PAT), conditional access table (CAT) or program map table (PMT) from the corrected multimedia information.

8. The system of claim 1, wherein the multimedia source is configured in a MPEG II format.

9. A method for digital multimedia broadcasting comprising:
   providing a multimedia source for generating a plurality of multimedia signal outputs;
   providing voice information using Internet Protocol;
   correcting the multimedia signal outputs and the voice information to generate corrected multimedia information;

generating one or more cellular digital multimedia broadcast (CDMB) data streams by de-multiplexing the corrected multimedia information and the voice information;

inserting a dedicated signaling information in each of the one or more CDMB data streams;

assembling at least one message capsule into the one or more CDMB data streams for indicating data recipients on a media control access (MAC) layer; and providing at least one data channel modulator for establishing a dedicated signaling path for the corrected multimedia information based on the one or more CDMB data streams on the MAC layer;

wherein the at least one data channel modulator each having a physical layer signaling based on a code-division multiple access (CDMA) or orthogonal frequency division modulation (OFDM) technology for mapping the CDMB data streams into a number of data packets on a forward packet data channel between a base station and a mobile station.

10. The method of claim 9, further comprising:

transmitting a control signal on a dedicated packet data control channel in response to a level-three (L3) control command.

11. The method of claim 10, wherein the transmitting step comprises the step of:

mapping the control signal into a forward packet data control channel between the base station and the mobile station, using a physical layer signaling based on CDMA or OFDM technology.

12. The method of claim 9, wherein the data packets are configured in a broadcast or multicast format.

13. The method of claim 12, wherein when the data packets are configured in the broadcast format, assembling a packet check sequence according to a MAC protocol into each of the CDMB data streams, and inserting a message capsule into one of the CDMB data streams.

14. The method of claim 12, wherein each CDMB data stream comprises a number of transport packets, each having a header followed by a message capsule.

15. The method of claim 9, further comprising the step of:
authenticating the mobile station.

16. The method of claim 9, further comprising the step of:
receiving a selection signal from the mobile station for selecting one or more interactive functions in association with the multimedia source.

* * * * *

UNITED STATES PATENT AND TRADEMARK OFFICE
CERTIFICATE OF CORRECTION

PATENT NO. : 7,529,221 B2　　　　　　　　　　　　　　　　　　Page 1 of 1
APPLICATION NO. : 11/280989
DATED : May 5, 2009
INVENTOR(S) : Stash Czaja and Feng Qian It is certified that error appears in the above-identified patent and that said Letters Patent is hereby corrected as shown below:

Title page, item [73] Assignee should read as follows

VIA Telecom Co., Ltd., San Diego, CA

Signed and Sealed this

Eighteenth Day of August, 2009

David J. Kappos
*Director of the United States Patent and Trademark Office*